United States Patent [19]

Shimabukuro et al.

[11] Patent Number: 4,457,598
[45] Date of Patent: Jul. 3, 1984

[54] REFLECTOR AND METHOD FOR MANUFACTURING THE SAME

[75] Inventors: Hajime Shimabukuro; Shuichi Watanabe; Shitomi Katayama; Akira Ohno, all of Yokohama, Japan

[73] Assignee: NHK Spring Co., Ltd., Yokohama, Japan

[21] Appl. No.: 333,284

[22] Filed: Dec. 22, 1981

[51] Int. Cl.³ .......................... G02B 5/08; B05D 5/06; B05D 3/04; B21D 39/00
[52] U.S. Cl. ................................. 350/288; 350/590; 427/167; 427/343; 427/344; 428/623; 428/624; 428/626; 428/631
[58] Field of Search ....................... 350/288, 320, 590; 427/167, 343, 344; 428/623, 624, 626, 631, 650, 450, 409, 701, 913; 204/130

[56] References Cited

U.S. PATENT DOCUMENTS 4,358,507 11/1982 Senaha et al. ..................... 350/288
4,364,637 12/1982 Ohno et al. ......................... 350/288
4,379,196 4/1983 Halper ............................... 427/162

FOREIGN PATENT DOCUMENTS 50-40348 9/1975 Japan ................................. 350/288
52-10741 1/1977 Japan ................................. 350/320
54-97155 8/1979 Japan ................................. 350/320

Primary Examiner—Jon W. Henry

[57] ABSTRACT

A reflector includes a base body exhibiting dielectric property at least at its surface. A reflecting layer made of aluminum is formed on one surface of the base body by vacuum deposition. A light-transmitting water-insoluble inorganic oxide layer is formed on the aluminum reflecting layer. The light-transmitting inorganic oxide layer has its micropores sealed by sealing agent comprising $H_2O$ or a carboxylate of an iron family element having a low valence.

26 Claims, 3 Drawing Figures

REFLECTOR AND METHOD FOR MANUFACTURING THE SAME

BACKGROUND OF THE INVENTION

I. Field of the Invention

The present invention relates to a reflector and a method for manufacturing the same and, more particularly, to an aluminum reflector which has good resistance to corrosion and a method for manufacturing the same.

II. Description of the Prior Art

An aluminum reflector is conventionally used for a reflecting shade for illumination, a parabolic reflector and the like. This aluminum reflector is constituted by an aluminum reflecting layer supported by a base body made of, for example, aluminum. The aluminum reflecting layer is generally coated with a light-transmitting inorganic oxide layer in order to prevent it from being degraded by the outer atmosphere.

The aluminum reflector of this type has advantages of good hardness, resistance to abrasion, oil resistance, heat resistance and the like by the presence of the light-transmitting inorganic oxide layer. However, this aluminum reflector does not have good resistance to chemicals. Therefore, the aluminum reflector is degraded by carbon dioxide, nitrogen monoxide, nitrogen dioxide, sulfurous acid gas, ammonia or the like which are contained in the air, so that the aluminum reflector may not be used with a desired performance for a long period of time.

The conventional aluminum reflector has another drawback in that the aluminum constituting the reflecting layer and the base body may be dissolved and corroded when the reflector is immersed into an electrolyte solution together with a metal which has a substantially higher ionization tendency, although when present alone in the electrolyte solution, the reflector may not be dissolved and corroded.

SUMMARY OF THE INVENTION

It is an object of the present invention to provide a reflector which has high resistance to chemicals, and thus can be used for a long period of time with a desired performance.

It is another object of the present invention to provide an aluminum reflector which is not subject to corrosion and degradation even if it is immersed in an electrolyte solution together with a metal which has an ionization tendency higher than that of aluminum.

In order to achieve the above and other objects of the present invention, there is provided a reflector comprising a base body exhibiting dielectric property at least at its surface; an aluminum reflecting layer vacuum-deposited on one surface of the base body directly or through a smoothing layer formed on the base body; a light-transmitting water-insoluble inorganic oxide layer vacuum-deposited directly on the reflecting layer; and a sealing agent comprising $H_2O$ or a carboxylate of an iron family element and sealing micropores of the inorganic oxide layer.

The present invention is based on the inventors' finding that the weak chemical resistance of the conventional aluminum reflector is inevitable because the protective inorganic oxide layer has, in view of its molecular arrangement, a low density—that is, the layer has a number of micropores—and a corrosive chemical may pass through the pores and reach the aluminum reflecting layer. That is, the inorganic oxide layer is either an amorphous layer or an unstable crystalline layer having a low density and thus a number of micropores if it is formed by vacuum deposition from an amorphous inorganic oxide and even from a crystalline inorganic oxide. According to the present invention, the micropores are sealed with a sealing agent to be described later.

DETAILED DESCRIPTION OF THE PREFERRED EMBODIMENTS

Figure 1:
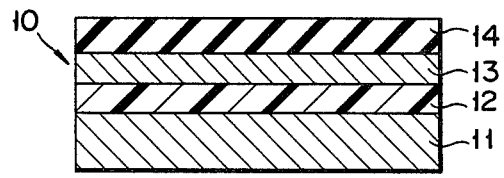
FIG. 1 is a sectional view illustrating the basic structure of a reflector according to the present invention.

The present invention will be described in detail with reference to the accompanying drawings. The same reference numerals denote the same parts.

FIG. 1 shows the basic structure of a reflector according to the present invention. Referring to FIG. 1, a reflector 10 has a support member, that is, a base body 11 exhibiting dielectric property at least at its surface. The base body can entirely be formed of a dielectric material. Alternatively, the base body can be constituted by an electrically conductive substrate whose surface is coated with a dielectric material. The former base body includes an inorganic insulating body such as a glass plate, a ceramic plate, a hard slate plate and the like, and polymer body such as polycarbonate plate, polyallyl carbonate plate, epoxy resin plate, polyimide plate and the like. The latter base body includes conductive substrates such as a metal or graphite whose entire surfaces are coated with an inorganic compound paint such as silica and porcelain or with a polyer paint such as an epoxy paint, polysiloxane paint and a polyester paint. The former base body is preferred for its longer durability.

One surface of the base body 11 is cleaned by an appropriate method, and further may be smoothed as needed. Cleaning may be performed by a known method, such as cleaning with an acid or an alkali, treatment with an oxidizing agent or a reducing agent, or electrolysis. Smoothing can be performed by a buff-polishing or chemical polishing.

A smoothing layer 12 is formed on the cleaned surface of the base body 11 as needed (i.e., when the surface of the base body 11 is not smoothed). The smoothing layer 12 may be formed by coating and hardening or baking an inorganic compound paint which can withstand vacuum deposition to be described later, such as an enamel or silicon oxide paint, or a high polymer paint which can withstand vacuum deposition, such as a polycarbonate paint, a polyallylcarbonate paint, an epoxy paint, a polyimide paint, a polysiloxane paint or the like.

An aluminum layer 13 which constitutes a reflecting layer is formed on the surface of the smoothing layer 12 (or it may be formed directly on the base body 11 when the base body 11 is smoothed) by vacuum deposition. The term "vacuum deposition" as used herein is intended to mean a method wherein a desired material (aluminum in this embodiment) is vaporized or ionized under reduced pressure to be deposited on a substrate (the base body 11 or the smoothing layer 12 in this embodiment) and includes well known methods such as vapor deposition, ion plating, sputtering or the like. The aluminum reflecting layer 13 is formed to a thickness of, preferably, 500 to 2,000 Å.

A light-transmitting water-insoluble inorganic oxide layer 14 which constitutes a protective layer for the reflecting layer 13 is formed on the surface of the aluminum reflecting layer 13 by vacuum deposition. The protective layer 14 is formed by vacuum-depositing a silicon oxide compound such as silicon dioxide, silicon monoxide or glasses; a single ceramic such as aluminum oxide, magnesium oxide, zirconium oxide, indium oxide or tin oxide; or a compound ceramic such as pyroceram, lithia ceramic or spinel. The protective layer 14 is formed to a thickness of, preferably, 0.5 to 5 μm.

The protective layer 14 as vacuum-deposited has low resistance to chemicals since a number of micropores are present therein as described above. The protective layer 14 is treated with a sealing agent. The sealing agent includes $H_2O$ or a carboxylate of an iron family element of low valence (that is, Fe (II), Co (II) or Ni (II)). The carboxylate is a water-soluble iron family metal salt of alkylcarboxylic acid, hydroxyalkylcarboxylic acid, aralkylcarboxylic acid, hydroxyaralkylcarboxylic acid, cycloalkylcarboxylic acid, hydroxycyclocarboxylic acid, or a mixture thereof. Examples of the carboxylate used in the present invention includes acetate, propionate, lactate, citrate, tartarate or a mixture thereof. The metal salts of nonvolatile carboxylic acid, such as lactate, citrate, tartarate and the like are very stable and are particularly suitable for sealing at high temperatures.

In order to seal the micropores of the protective layer 14 using the carboxylate, the protective layer 14 is sprayed with or immersed in an aqueous solution of the carboxylate under the normal atmospheric pressure or a higher pressure and at a temperature of 0° to 200° C. (without boiling) for 1 second to 1 hour. The simplest method is that the protective layer 14 is immersed in the aqueous solution at room temperature to a temperature of 100° C. under the ambient pressure. The aqueous solution may contain the carboxylate at the saturation concentration. However, in general, the concentration of the carboxylate is preferably 5 to 30%. When the concentration of the carboxylate is low, the treatment requires more time. Preferably, a corresponding free carboxylic acid is dissolved in the aqueous solution, because if the carboxylic acid used is volatile, the acid component may be lost due to evaporation so that the iron family metal ion of low valence in the solution is changed to an ion of high valence, thus disabling the sealing effect.

In order to perform the sealing at high speed, an intermediate product of the reflector which is not treated with the sealing agent is immersed in the aqueous solution of the carboxylate, and electrolysis is performed using the reflecting layer as a cathode and a piece of metal as an anode which is the same kind of metal as that of the carboxylate used. In this case, the electrolytic conditions may vary dependent on the type and concentration of the aqueous solution, the thickness of the base body, or the like. However, it is preferable that the electrolysis be performed with a voltage of 10 V or less and a current density of 500 mA/cm$^2$ or less for a few seconds to 1 hour.

Further, the sealing of the micropores of the protective layer can be effected by using boiling water or water vapor. In such cases, the sealing is conducted under the conditions (temperature and/or time) such that the protective layer is not peeled off the reflecting layer and yet the sealing is accomplished. Specifically, the protective layer is immersed in boiling water at a pH of 5-9 for a period of time within 20 minutes, preferably 5 minutes, under a temperature of 95° C. or more. Alternatively, the protective layer is treated with saturated water vapor at 100° C. for 5 to 20 minutes, at 150° C. for 2 to 10 minutes, or at 200° C. for 1 to 5 minutes, for example. The maximum vapor temperature is 200° C.

After the protective layer has its micropores sealed, it is sufficiently washed with water and dried to prepare a reflector product of the present invention. The sealing mechanism by the carboxylate is not clear. However, it is assumed that the carboxylate passes through the micropores of the protective layer 14 and reaches the surface of the aluminum reflecting layer 13 so that the carboxylate reacts with aluminum on the uppermost layer of the aluminum reflecting layer 13 to form a chelate, and the volume of the carboxylate increases to seal the micropores. $H_2O$ enters the micropores and react with the inorganic oxide to form a hydrate therewith, thus increasing the volume of the oxide layer and sealing the micropores.

A reflector of FIG. 1 thus made has a protective layer whose micropores are sealed and is highly resistant to chemicals. Further, when the reflector is immersed in an electrolyte solution, it is not corroded if present alone in the solution. But it may be corroded if a different metal of a higher ionization potential than that of aluminum is present in the solution because a partial cell may be formed between the aluminum reflecting layer and the different metal since the peripheral sides of the reflecting layer are exposed.

Figure 2:
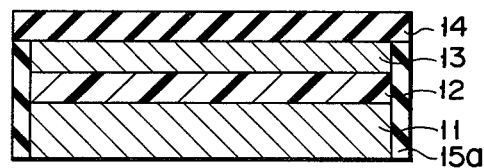
FIGS. 2 and 3 are sectional views of other embodiments of the reflector according to the present invention.
Figure 3:
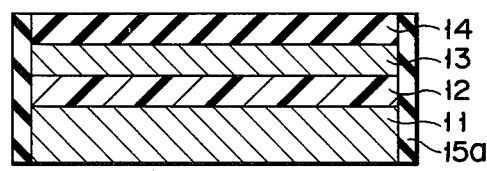

In order to avoid the partial cell formation, the peripheral side faces of at least the aluminum reflecting layer 13 are preferably coated with an insulating layer. The insulating layer may be made of the materials as described with reference to the smoothing layer 12. The embodiments of the reflectors including the insulating layer are shown in FIGS. 2 and 3. These embodiments are the same except that the insulating layers cover the peripheral sides of different parts.

FIG. 2 shows a structure in which an insulating layer 15a covers the peripheral sides of the base body 11, the smoothing layer 12 and the reflecting layer 13, respectively. In order to form this structure, the smoothing layer 12 and the reflecting layer 13 are formed and the insulating layer 15a is then formed. Finally, the protective layer 14 is formed and sealing is performed. The formation of the reflecting layer can not be directly followed by the formation of the protective layer. To manufacture the reflector in this method some measures must be taken. First, the insulating layer 15a must be made of a material which can withstand the vacuum deposition to be performed, that is, a material which has heat resistance and which contains little, if any, volatile solvent or the like. Second, the insulating layer 15a must be formed under manufacturing conditions such that the surface reflectivity of the aluminum reflecting layer 13 is not lowered much, and the insulating layer 15a must be formed within a predetermined period of time to maintain a predetermined reflectivity.

FIG. 3 shows a structure in which an insulating layer 15b covers the peripheral side faces of the base body 11, the smooth layer 12, the reflecting layer 13 and the protective layer 14. With this structure, resistance to corrosion is much improved as compared with the structure shown in FIG. 2. The protective layer 14 can be formed immediately after the aluminum reflecting layer 13 is formed, so that degradation of the reflectivity of the aluminum reflecting layer 13 due to oxidation and contaminations is prevented. In order to accomplish this structure, the insulating layer 15b is formed after the micropores of the protective layer 14 are sealed with the sealing agent (Method A). Alternatively, the insulating layer 15b is first formed, and the protective layer 14 is formed and its micropores are sealed with the sealing agent (Method B). According to Method (A), the peripheral side faces of the aluminum reflecting layer 13 are permeated slightly by the sealing agent, and the insulating layer 15b must be formed after sufficient washing and drying has been performed. According to Method (B), problems occurring in Method (A) do not occur, so that Method (B) is preferred to Method (A).

As described above, since the protective layer of the reflector of the present invention has its micropores sealed by the sealing agent, the reflecting mirror has strong resistance to acid, alkali and salts. When the reflector according to the present invention is immersed alone in an electrolyte solution, it is little corroded. The reflector having the insulating layer is not corroded even when immersed in an electrolyte solution together with another metal. The reflector of the invention also has good reflectivity. Therefore, the reflector according to the present invention can be used with a predetermined performance for a long period of time for a parabolic reflector for a solar plant, a reflector for air-conditioning and hot-water supply for family and business use, a reflecting shade for illumination equipment, a reflecting mirror and a heat-collecting mirror for a copying machine, a lightweight mirror, a reflecting mirror for interior decoration, a reflecting mirror for automobile headlights, and the like. Further, the reflector of the invention can be used as an optical video disk and in an optical voice recorder.

Examples of the present invention will be described below.

EXAMPLE 1

100 parts of an epoxy resin (Epicoat 828, Shell Co.) were mixed with 75 parts of an aromatic carboxylic acid anhydride (NMA) hardening agent. The mixture was charged in a mold which had a depth of 5 mm and heated at 100° C. for 5 hours, at 150° C. for 10 hours, and at 200° C. for 10 hours to prepare an epoxy resin plate.

A silicone resin (the main components are 80 parts of tetrahydroxysilane and 20 parts by dimethyldihydroxysilane) was coated on the surface of the epoxy resin plate. The epoxy resin plate was then heated at 80° C. for 2 hours and at 150° C. for 1 hour for hardening the silicone resin to prepare a smoothing layer.

Aluminum was vapor-desposited on the smoothing layer to a thickness of 1,500 Å and silicon dioxide was vapor-deposited on the aluminum layer to a thickness of 1.5μ to form a reflecting layer and a protective layer, respectively. Thus, a reflector intermediate product was prepared.

The intermediate product was immersed in a sealing agent solution obtained by adding 100 ml of distilled water to 100 ml of a saturated aqueous solution of nickel acetate (II) for 30 minutes to seal the micropores of the protective layer. The intermediate product was removed from the solution, cleaned with distilled water, and dried with air. Thereafter, an epoxy resin was coated on the entire peripheral side faces of the intermediate product and hardened to form the insulating layer. Thus, a desired reflector was obtained.

On the protective layer of the thus obtained reflector was dripped a 15% aqueous solution of hydrochloric acid or a 15% aqueous solution of sodium hydroxide. The reflector was left to stand for 30 minutes, washed with water and dried with air. Then, to evaluate the bonding between the protective layer and the reflecting layer, a test was conducted. A cellophane tape with an adhesive layer on it was put on the protective layer and peeled therefrom (cellophane tape test). No fragments of the protective layer were sticked to the cellophane tape.

Comparative Example 1

In order to prepare a reflector, the same procedure was repeated as in Example 1, except that sealing was not performed. The same test was conducted on the reflector as in Example 1. The protective layer treated with the sodium hydroxide solution was entirely peeled off the reflecting layer.

EXAMPLE 2

A degreased stainless steel plate of 0.4 mm thickness was immersed in a mixed solution obtain by adding 2 parts of a 25% xylene solution of a hardening agent consisting of nickel acetate and ethylene diamide in the mixing ratio of 1:1 to 100 parts of a 60% xylene solution of a phenylmethylsilicone resin containing 83.6 mol % of the phenyl group. The plate was removed from the solution and dried with air. The plate was then heated at 130° C. for 5 hours and at 230° C. for 15 hours to cure the resin. The stainless steel plate was thus entirely coated with the resin to provide the base body.

Aluminum was vapor-deposited on the smoothing layer to a thickness of 1,500 Å and silicon dioxide was then vapor-deposited thereon to a thickness of 1.5μ to form the reflecting layer and the protective layer, respectively. The intermediate product was thus prepared. An epoxy resin was coated on all the peripheral side faces of the intermediate product and cured to form the insulating layer. The protective layer was sealed in the same manner as in Example 1 to obtain a desired reflector.

When the cellophane tape test was conducted in the same manner as in Example 1, the protective layer was not peeled off. Further, the reflector was immersed in an 15% aqueous solution of hydrochloric acid or in an 15% aqueous solution of sodium hydroxide for 30 minutes, but peeling of the protective layer did not occur.

Comparative Example 2

To prepare a reflector, the same procedure was repeated as in Example 2, except that the insulating layer was not formed. When the immersion test was performed on the reflector as in Example 2 in the presence of a steel plate, the protective layer was partially peeled off.

EXAMPLE 3

Aluminum was vapor-deposited to a thickness of 1,250 Å on a degreased blue glass plate having a thickness of 2 mm to form a reflecting layer. An epoxy resin was coated on the side faces of the glass plate and the reflecting layer and cured to form the insulating layer. Silicon dioxide was vapor-deposited on a reflecting layer to a thickness of 2μ to form the protective layer.

The protective layer was sealed in the same manner as in Example 1 to obtain a desired reflector.

A chemical dropping test and an immersion test were performed on the reflector as in Example 1 and Comparative Example 2. The protective layer was not peeled off.

EXAMPLE 4

The intermediate product was prepared as in Example 1. The intermediate product was immersed in an aqueous solution obtained by adding 100 ml of distilled water to 100 ml of a saturated aqueous solution of cobalt (II) citrate for 30 minutes. The intermediate product was removed from the solution, washed with distilled water and dried with air to obtain a desired reflector.

The reflector was treated with the aqueous solution of hydrochloric acid and the aqueous solution of sodium hydroxide as in Example 1, and the cellophane tape test was conducted. No fragment of the protective layer was sticked to the tape.

Comparative Example 3

The same procedure was repeated as in Example 4, except that the insulating layer was not formed and the sealing was not performed. The same test was conducted on the reflector thus obtained, as in Example 1. The protective layer treated with sodium hydroxide solution was entirely peeled off.

EXAMPLE 5

The intermediate product was prepared as in Example 2. The product was immersed in a solution obtained by adding 100 ml of distilled water to 100 ml of a saturated aqueous solution of nickel (II) acetate. Electrolysis was conducted for 30 minutes by applying a voltage of 1.26 to 1.4 volts between the reflecting layer and a nickel plate immersed in the solution to obtain a desired reflector.

On the protective layer of the reflector thus obtained was dripped 15% aqueous solution of sodium hydroxide. No change was observed.

EXAMPLE 6

On a clean polycarbonate plate aluminum was vapor-deposited to a thickness of 500 Å, and silicon dioxide was vapor-deposited on the aluminum layer to a thickness of 2 μm to prepare an intermediate product. The intermediate product was immersed for 30 minutes in a solution obtained by adding 100 ml of distilled water to 100 ml of a saturated aqueous solution of nickel (II) acetate. After removed from the solution, the product was washed with distilled water and dried with air to obtain a desired reflector.

The reflector was treated with the solution of hydrochloric acid and the solution of sodium hydroxide as in Example 1, and the cellophane tape test was conducted. No fragment of the protective layer was sticked to the tape.

Comparative Example 4

The reflector was prepared as in Example 6, except that no sealing treatment was conducted. The same test was conducted as in Example 6. The entire protective layer was peeled off the reflecting layer in case where the protective layer was treated with the sodium hydroxide solution.

EXAMPLE 7

The intermediate product was prepared as in Example 1. The product was immersed in boiling water for 5 minutes, and was removed from the water. After cooled to room temperature, the product was washed with distilled water and dried with air to obtain a desired reflector.

The reflector was treated with the solution of hydrochloric acid and the solution of sodium hydroxide as in Example 1, and the cellophane tape test was conducted. No fragment of the protective layer was sticked to the tape.

EXAMPLE 8

The intermediate product was prepared as in Example 1. The product was allowed to stand in the saturated steam at 200° C. for one minute, and was removed from the water vapor. After cooled to room temperature, the product was washed with distilled water and dried with air.

The reflector was treated with the solution of hydrochloric acid and the solution of sodium hydroxide as in Example 1, and the cellophane tape test was conducted. No fragment of the protective layer was sticked to the tape.

What we claim is:

1. A reflector comprising a base body exhibiting dielectric property at least at its surface, an aluminum reflecting layer vacuum deposited on one surface of said base body directly or through a smoothing layer, a light-transmitting water-insoluble inorganic oxide layer directly vacuum deposited on said reflecting layer, and a sealing agent comprising $H_2O$ or a carboxylate of an iron family element having a low valence and sealing micropores of said inorganic oxide layer.

2. A reflector according to claim 1, wherein said base body is formed of a dielectric material.

3. A reflector according to claim 1 or 2, wherein said reflecting layer is formed on said base body through said smoothing layer.

4. A reflector according to claim 3, wherein said smoothing layer is formed of an inorganic compound or a resin paint.

5. A reflector according to claim 1, further including an insulating layer which covers at least side faces of said base body and said reflecting layer, respectively.

6. A reflector according to claim 5, wherein said insulating layer further covers side faces of said smoothing layer.

7. A reflector according to claim 5 or 6, wherein said insulating layer further covers side faces of said light-transmitting inorganic oxide layer.

8. A reflector according to claim 1, wherein said reflecting layer has a thickness of 500 to 2,000 Å.

9. A reflector according to claim 1, wherein said light-transmitting inorganic oxide layer has a thickness of 0.5 to 5 μm.

10. A method for manufacturing a reflecting mirror comprising the steps of:
    (a) forming a reflecting layer by directly depositing aluminum on one surface of a base body exhibiting dielectric property at least at its surface or by depositing aluminum on one surface of said base body through a smoothing layer by vacuum deposition;
    (b) forming a light-transmitting protective layer on said reflecting layer by directly depositing a water-insoluble inorganic oxide material thereon by vacuum deposition to provide a reflector intermediate product; and (c) sealing micropores of said protective layer by treating with a sealing agent comprising $H_2O$ or a carboxylate of an iron family metal having a low valence.

11. A method according to claim 10, wherein said smoothing layer is formed directly on the surface of said base body.

12. A method according to claim 10 or 11, including the step of forming an insulating layer which covers side faces of at least said base body, said smoothing layer and said reflecting layer, respectively, between steps (a) and (b).

13. A method according to claim 10 or 11, including the step of forming said insulating layer which covers side faces of at least said base body, said smoothing layer, said reflecting layer and said protective layer, respectively, between steps (b) and (c).

14. A method according to claim 10 or 11, including the step of forming said insulating layer which covers side faces of at least said base body, said smoothing layer, said reflecting layer and said protective layer, respectively, after step (c).

15. A method according to claim 10, wherein said reflecting layer is formed to a thickness of 500 to 2,000 Å.

16. A method according to claim 10, wherein said protective layer is formed to a thickness of 0.5 to 5 μm.

17. A method according to claim 10, wherein the step (c) comprises immersing at least said protective layer in an aqueous solution of the carboxylate under atmospheric pressure or under pressurized conditions at a temperature of 0° to 200° C. for 1 second to 1 hour.

18. A method according to claim 10, wherein the step (c) comprises spraying said protective layer with an aqueous solution of the carboxylate at a temperature of 0° to 200° C.

19. A method according to 10, wherein the step (c) comprises conducting electroysis in an aqueous solution of the carboxylate, using the reflecting layer of the intermediate product as a cathode, and a metal piece as an anode which is the same kine as the metal of the carboxylate used.

20. A method according to claim 19, wherein the electrolysis is performed at a voltage of 10 V or less and a current density of 500 $mA/cm^2$ or less for 5 seconds to 1 hour.

21. A method according to any one of claims 17 to 20, wherein a carboxylic acid component of the carboxylate is selected from the group consisting of acetic acid, propionic acid, butyric acid, lactic acid, citric acid, and tartaric acid.

22. A method according to claim 10, wherein the step (c) comprises immersing the protective layer in boiling water at a pH of 5 to 9 for a period of time within 20 minutes.

23. A method according to claim 10, wherein the step (c) comprises allowing the protective layer to stand in a saturated water vapor at a temperature of up to 200° C. for a period of time such that the protective layer in not peeled from the reflecting layer.

24. A method according to claim 23, wherein the step (c) is conducted at 100° C. for 5 to 20 minutes.

25. A method according to claim 23, wherein the step (c) is conducted at 150° C. for 2 to 10 minutes.

26. A method according to claim 23, wherein the step (c) is conducted at 200° C. for 1 to 5 minutes.

* * * * *